US011602810B2

(12) United States Patent
Hohmann et al.

(10) Patent No.: US 11,602,810 B2
(45) Date of Patent: Mar. 14, 2023

(54) METHOD FOR DOCUMENTED TIGHTENING AND RE-TIGHTENING OF A SCREW CONNECTION

(71) Applicants: Jörg Hohmann, Meschede (DE); Frank Hohmann, Warstein (DE)

(72) Inventors: Jörg Hohmann, Meschede (DE); Frank Hohmann, Warstein (DE)

(*) Notice: Subject to any disclaimer, the term of this patent is extended or adjusted under 35 U.S.C. 154(b) by 513 days.

(21) Appl. No.: 16/751,569

(22) Filed: Jan. 24, 2020

(65) Prior Publication Data

US 2020/0238454 A1 Jul. 30, 2020

(30) Foreign Application Priority Data

Jan. 29, 2019 (DE) ...................... 10 2019 102 133.2
Feb. 15, 2019 (DE) ...................... 10 2019 103 850.2

(51) Int. Cl.
*B23P 19/06* (2006.01)
*B25B 23/142* (2006.01)
*B25B 29/02* (2006.01)

(52) U.S. Cl.
CPC ........ *B23P 19/067* (2013.01); *B25B 23/1422* (2013.01); *B25B 29/02* (2013.01)

(58) Field of Classification Search
CPC ..... B23P 19/067; B25B 23/1422; B25B 29/02
USPC ....................................................... 81/57.38
See application file for complete search history.

(56) References Cited

U.S. PATENT DOCUMENTS

| 7,036,407 | B2* | 5/2006 | Pyre | B25B 23/14 |
| | | | | 81/429 |
| 7,062,998 | B2* | 6/2006 | Hohmann | B25B 29/02 |
| | | | | 81/55 |
| 2004/0261583 | A1 | 12/2004 | Hohmann et al. | |
| 2010/0175240 | A1 | 7/2010 | Wagner et al. | |
| 2011/0271798 | A1 | 11/2011 | Wagner et al. | |
| 2014/0020515 | A1* | 1/2014 | Hohmann | F16B 31/043 |
| | | | | 81/57.38 |
| 2016/0271775 | A1 | 9/2016 | Hohmann et al. | |
| 2021/0178534 | A1* | 6/2021 | Bosukonda | F03D 13/10 |

* cited by examiner

*Primary Examiner* — Hadi Shakeri
(74) *Attorney, Agent, or Firm* — Gudrun E. Huckett

(57) ABSTRACT

In a tightening method for a screw connection of a bolt and a nut by using a tensioning device, a rotary drive, and a process control unit with documentation module, the nut is tightened with the rotary drive by a tightening moment required for the nut to bear against a support. The screw connection is elongated by exerting axial tension on a threaded end of the bolt protruding from the nut. The nut is further tightened while maintaining elongation, and a rotation angle covered during further tightening is detected by a rotation angle sensor. Lengthening of the bolt is calculated from the rotation angle and thread geometry of the screw connection. A longitudinal force in the threaded bolt is calculated from lengthening of the bolt, bolt diameter and bolt length. The calculated longitudinal force and an identifier identifying the screw connection are stored in the documentation module.

11 Claims, 5 Drawing Sheets

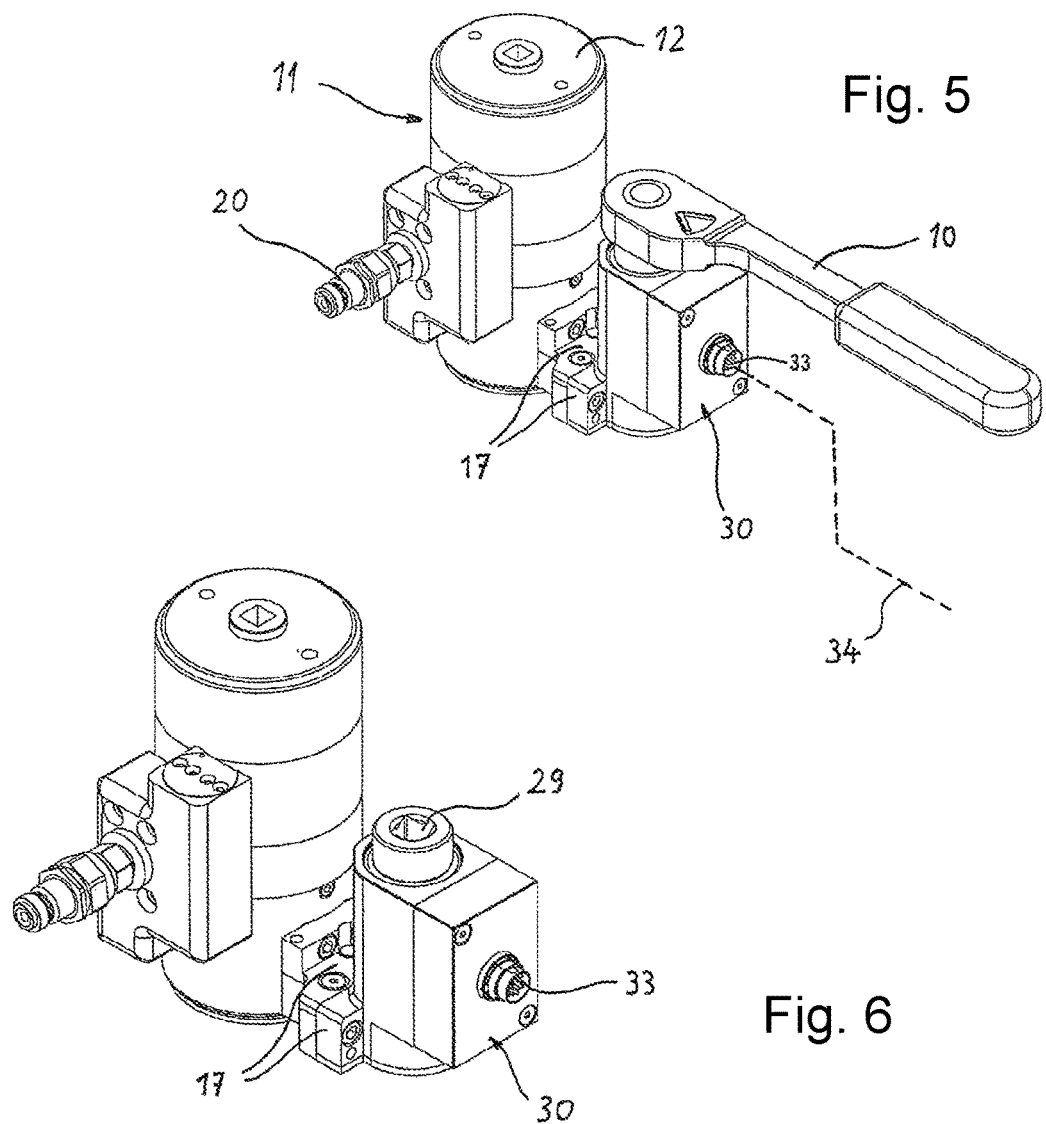

METHOD FOR DOCUMENTED TIGHTENING AND RE-TIGHTENING OF A SCREW CONNECTION

BACKGROUND OF THE INVENTION

The invention relates to a method for the documented tightening or retightening of a screw connection comprised of a threaded bolt and a nut screwed thereto and supported against a support, by using an axially operating tensioning device, a rotary drive for the nut, and a process control unit provided with a documentation module.

Hydraulically operated, axially working screw tensioning cylinders are disclosed in US 2004/0261583; US 2016/0271775; US 2010/0175240; US 2011/0271798. For tensioning or retensioning a screw connection, comprised of a threaded bolt and a nut screwed thereon and supported against a support, initially an exchangeable bush of the tensioning cylinder is screwed onto the free end of the threaded bolt protruding beyond the nut. To this end, the exchangeable bush is provided with a corresponding internal thread. The exchangeable bush is arranged inside a hydraulic cylinder housing and is surrounded by at least one piston. The piston, as part of a hydraulic piston-cylinder unit, may axially entrain the exchangeable bush, whereby the threaded bolt is temporarily axially extended. While it is extended, the nut is retightened, i.e. turned, by means of a rotary drive arranged externally on the cylinder housing.

This rotary drive is configured in the screw tensioning cylinder according to US 2004/0261583 as a geared electrical motor and has a rotation angle sensor which detects the rotation angle of the rotary drive. Moreover, a computing apparatus is present, the computing apparatus calculating from the detected rotation angle, in combination with the known thread pitch of the threaded bolt, the extension thereof and the resulting pretensioning force of the threaded bolt and displaying this to the user.

Generally, the operating parameters used in a screw tensioning process and general data relating to the screw case are not systematically detected and documented. Such data may relate, for example, to the brand, the type or the model of the threaded bolts or nuts and the tightening and torque values of the bolts and/or nuts. Frequently, the screw tensioning devices do not have suitable devices for detecting and documenting such data. The documentation, however, is particularly important in screw connections in which a permanent control check is required and in which for safety reasons proof has to be provided of a sufficiently strong screw connection. This is the case, for example, in reactor or storage containers with dangerous chemical or nuclear goods.

It may a problem when the user of the tensioning device does not know the range of the required or ideal hydraulic pressure and the tightening pressure and/or tightening force associated therewith for the bolt to be tensioned. The values may vary depending on the type, brand or size of the bolt. The result of this may be that longitudinal forces which are too small or too great are present after the bolt has been tightened. In addition to these factors which influence the operating safety, the quality and precision of the tightening or retightening process may also be reduced when the bolts are not tightened with the ideal tensioning force and as a result the longitudinal force in the threaded bolt does not correspond to an optimum force. A further drawback is the use of an inappropriate torque when turning the nut.

It is known to provide a clear identification of screw connections by scanning an individual identifier present on the screw connection, preferably a barcode identifier. The identifier which is thus determined is stored in the form of data in a documentation module. By means of the tensioning device, the screw connection is elongated by axial tension on the threaded end of the threaded bolt and the tightening force and/or the hydraulic tightening pressure applied at the same time is also stored in the documentation module. During the elongation the nut is turned by using, for example, a manual torque wrench.

The object of the invention is to permit a documentation which is specific for the individual screw case, when tightening or retightening high-strength screw connections by means of axially operating tensioning devices, and thus to improve the quality and reproducibility of the screwing process.

SUMMARY OF THE INVENTION

This object is achieved by a method of the aforementioned kind that comprises, in accordance with the invention, the following steps:

a) tightening the nut by means of the rotary drive with a tightening moment which is at least required so that the nut bears without a gap against the support;

b) elongating the screw connection by activating the tensioning device, by exerting axial tension on the threaded end of the threaded bolt protruding beyond the nut;

c) further tightening of the nut by means of the rotary drive, whilst maintaining the elongation, and at the same time detecting a rotation angle covered during this further tightening by means of a rotation angle sensor;

d) calculating the lengthening of the threaded bolt associated with the elongation, from
the rotation angle covered and
the thread geometry of the screw connection;

e) calculating a longitudinal force F in the threaded bolt from
the lengthening,
the bolt diameter and
the bolt length;

f) storing the calculated longitudinal force, together with an identifier which identifies the screw connection, in the documentation module.

By using this method, important characteristic data for the individual screw case is documented such that the quality of the screw connection obtained remains able to be checked, even retrospectively. Further additional data may be of a general nature and, for example, encompass the manufacturers mark, the make, the serial number, the type, the model or further physical and technical characteristics of the screw connection.

A parameter of particular importance is the longitudinal force which is present after tightening or retightening the screw connection in the longitudinally deformed threaded bolt, which represents the tensile strain in the bolt. The longitudinal force is dependent on the lengthening and thus the extension to which the threaded bolt is subjected during the tensioning process, preferably carried out hydraulically.

Thus, in a first calculating step, the lengthening of the threaded bolt associated with the elongation is calculated
from the rotation angle covered during the turning of the nut,
and the thread geometry of the screw connection.

In this case the rotation angle covered is not necessarily the rotation angle of the nut itself but it may also be a different rotation angle coupled to the rotation angle of the nut. For example, a gear element of the rotary drive may be detected by means of a rotation angle sensor, or the rotation angle sensor is a component of the handheld tool used for tightening the nut or the rotation angle sensor is structurally integrated in the cylinder housing of the tensioning device.

The thread geometry of the screw connection used in the first calculating step as a calculation parameter is the thread pitch of the thread on the threaded bolt and the nut. Thus, a longitudinal dimension may be directly calculated from the two geometric values, the rotation angle and the thread pitch, i.e. here the value relating to the elongation of the threaded bolt achieved by the axial tensioning, i.e. the lengthening thereof.

In a second calculating step, the longitudinal force in the threaded bolt acting in the tensile direction is then calculated, and namely from the lengthening of the threaded bolt determined in the first calculating step,
the bolt diameter of the threaded bolt,
and the bolt length.

In this case, the bolt length used for the calculation is not the absolute length of the threaded bolt including its widened bolt head. Instead it is the length to which the threaded bolt significantly deforms which is relevant. The parts of the threaded portion of the threaded bolt and, if present, a threadless shank portion of the threaded bolt form the length which is relevant in this regard. The relevant bolt length used in the second calculating step in this case is only that length on the threaded portion and optionally on the shank portion which extends between the bolt head and also the substantially rigidly retained nut. Thus, the lengthening is carried out on this longitudinal portion of the bolt during the tensioning process.

Being able to calculate an accurate value for the longitudinal force in the threaded bolt depends on the accuracy and the reproducibility when retightening the nut. Thus, tightening the nut may result in settling processes, primarily due to unevenness on the contact surfaces.

For this reason, a multi-step approach is taken. In the above method step a) the nut, preferably while the tensioning device is operated in a preliminary step at a low pressure of, for example, 50 bar hydraulic pressure, is tightened by means of the rotary drive with such a tightening moment that settling processes are substantially eliminated, resulting in the nut bearing substantially without a gap against the support.

Only after the substantially gap-free contact of the nut with the support is ensured does the activation of the tensioning device take place in step b) at the actual hydraulic system pressure of, for example, 1500 bar, and thus the elongation of the screw connection by exerting a high axial tension on the threaded end of the threaded bolt. By maintaining the high axial tension, the further re-tightening and/or turning of the nut is then carried out in step c) by means of the rotary drive, and the detection of a rotation angle covered during this further retightening by means of the rotation angle sensor.

Preferably, in order to keep the risk of incorrect operation by the user as low as possible, for the further retightening of the nut according to step c) the same tightening moment is used as in the original retightening of the nut according to step a). A further setting of the torque wrench is thus not required.

Based on the measures according to the method steps a) to c) the calculating steps d) and e) are carried out. In this case, in a first calculating step the lengthening of the threaded bolt associated with the elongation is calculated from the rotation angle covered during the further retightening of the nut and the thread geometry of the screw connection.

In a second calculating step based thereon, the longitudinal force in the threaded bolt is calculated from the lengthening
the bolt diameter
and the relevant bolt length.

Finally, according to the method step f) the longitudinal force in the threaded bolt, thus calculated together with an identifier which identifies the screw connection, is stored as a dataset in the documentation module.

The individual screw connection is identified by scanning and the identification result is stored in the documentation module. In the documentation module the identified screw connection may be additionally assigned a date, a time, a project number or other data. This data is also stored in the common dataset and thus is able to be checked at any time.

The data is preferably stored in a common file which is deposited on a server, an external computer unit or in a data cloud. The same applies to the tightening force applied and/or the hydraulic tightening pressure used, and for the torque actually applied when retightening the nut. The data is stored in the documentation module as a common dataset. This documentation permits the quality and status of each individual screw connection to be checked, which may be checked at any time, even retrospectively, namely for a certification.

According to a preferred embodiment of the method, the torque actually applied when retightening the nut by means of the rotary drive is also detected by measuring technology and the measured value is documented in the documentation module. For detecting the torque, for example, a torque sensor arranged in the rotary drive is used. Alternatively, the torque is detected on the handheld tool used, i.e. for example on a manual torque wrench by measuring technology.

According to an embodiment of the method, after the identification of the screw connection, the process control unit proposes to the user a tightening force and/or a tightening pressure stored in a database, before the user activates the tensioning device. To this end, the process control unit may access an electronic database. Optimal and/or recommendable values and/or value ranges for tightening forces and/or hydraulic tightening pressures for the type of respectively identified screw connection are stored therein.

When the user, however, from personal experience prefers a different tightening force and/or a different tightening pressure, the user does not accept the parameter proposal of the process control unit. The user then manually inputs a value and activates the tensioning device. This may also be documented in the documentation module.

According to a further embodiment, after the identification of the screw connection, a tightening force and/or a tightening pressure which is stored as optimal in the database for this particular screw connection type is selected by the process control unit, and the hydraulic pump of the screw tensioning cylinder is automatically, i.e. independently, brought to this pressure. The hydraulic pump, which is connected to the piston chamber of the screw tensioning cylinder via corresponding supply and discharge lines, is thus activated by the process control unit to a specific pump pressure by means of signal technology.

For carrying out the method a hydraulically driven tensioning device is used. This tensioning device comprises a cylinder housing which is configured as a hydraulic cylinder, an exchangeable bush which is arranged in the cylinder housing and which at its end facing the threaded bolt is provided with an internal thread and which is able to be screwed onto the threaded bolt, and at least one piston which is axially movable in the cylinder housing and connectable to a hydraulic supply, and through which the exchangeable bush passes centrally, and as a result the exchangeable bush may be axially entrained.

The cylinder housing or a component rigidly connected thereto is supported on the support, for example a machine element, against which the nut is also supported. The described method is advantageous primarily when using a hydraulic tensioning device. Thus, the hydraulic elongation of the threaded bolt results in an enormous longitudinal force in the threaded bolt. The determination and documentation of this longitudinal force, therefore, is particularly important for the assessment of the quality of the tightening process, even retrospectively. With very high tightening forces and/or tightening pressures, there is always the risk of the threaded bolt springing out or shooting out when under too much tensile strain. Thus, the correct choice of suitable and/or optimal tightening forces and/or tightening pressures for the identified screw connection is advantageous, either with or without release by the user.

When preparing the tensioning process, the exchangeable bush may be screwed onto the threaded bolt by the handheld tool which is used in any case for turning the nut. The screwing of the exchangeable bush onto the bolt, on the one hand, and the turning of the nut, on the other hand, are carried out in this case by one and the same handheld tool, for example a torque wrench with a ratchet mechanism.

The identifier of the screw connection is scanned by a sensor, in particular a barcode scanner. In this case it may be an optical sensor. The sensor may be a component integrated in the screw tensioning cylinder, a component of the handheld tool used or a separate device.

The sensor and/or barcode scanner may, in particular, be arranged externally on or internally in the screw tensioning cylinder.

However, the arrangement of the sensor on the handheld tool may have advantages regarding the flexibility and the handling of the scanner. Thus, the handheld tool is compact and of lighter weight than the heavy tensioning device.

A portable computer, a correspondingly programmed tablet computer or a smartphone serve as the process control unit. It is important that the control unit has a display unit and an input unit. The display unit and the input unit may, for example, be embodied together in a touch screen. The sensor for identifying the identifier is connected by signal technology to the process control unit.

The tensioning device and/or the handheld tool may be provided with a transmitting and receiving unit connected by signal technology to the process control unit, and as result data exchange with the process control unit is possible. In this case the process control unit also has a transmitting and receiving unit.

The transmitting and receiving units may be connected together by signal connection, in a wireless or wired manner. For example, WLAN, radio or UMTS are suitable therefor. Practically any type of modern wireless signal transmission may be suitable.

Advantageously a common application program is present for the process control unit and the sensor recording the identifier, the application program, for example, being installed in a computer unit.

The turning of the nut is carried out by means of the rotary drive which is preferably arranged externally on the tensioning device. The rotation angle sensor may be a component of the rotary drive. The rotation angle sensor detects a rotation angle which is covered during the tightening and/or turning.

Alternatively, the rotation angle sensor may be arranged on the handheld tool, i.e. the torque wrench. Such an arrangement is primarily considered when the handheld tool is configured as a ratchet with a corresponding rotary mechanism.

The detected angle value may be stored, for example, in a documentation module. To this end, the rotation angle sensor is connected, for example via the application program, by signal technology to the process control unit, whereby the detected rotation angle value is available for a computer-technical evaluation by the process control unit. During this evaluation, the extension obtained and thus the lengthening of the threaded bolt may be calculated from the rotation angle value covered during the turning of the nut, in conjunction with the known thread geometry of the screw connection, i.e. in particular the thread pitch on the threaded bolt and on the nut. This calculated value of the lengthening may be stored in the documentation module and thus permanently documented.

When the rotation angle corresponding to the lengthening of the threaded bolt is covered and the nut turned with a predetermined torque until it bears without a gap, it is ensured that the threaded bolt has been elongated with the correct force and that the tensile force and/or longitudinal force which is present in the extended threaded bolt has a specific optimal value for the respective bolt type, and at least lies in a corresponding value range.

The tensile and/or longitudinal force in the threaded bolt is determined by computer from the previously calculated lengthening of the threaded bolt, the bolt cross section and in this case, in particular, the diameter thereof, and the bolt length detected from the extension.

The documentation module comprises a memory and/or a database. The data of the identification and the tightening and turning process may be stored therein and later recalled, in particular the applied tightening force and/or tightening pressure, the actually applied manual torque and the tensile force which is present due to the tensioning process in the threaded bolt, i.e. the longitudinal force.

BRIEF DESCRIPTION OF THE DRAWINGS

Further details and advantages of the method are disclosed in the following description of an exemplary embodiment shown in the drawing.

FIG. 5 shows in a perspective view a second embodiment of a hydraulically operating threaded bolt-tensioning device including the positioned handheld tool.

FIG. 6 shows the same threaded bolt-tensioning device without the handheld tool.

FIG. 7 shows the objects according to FIG. 5 in a perspective exploded view.

DESCRIPTION OF PREFERRED EMBODIMENTS

Figure 1:
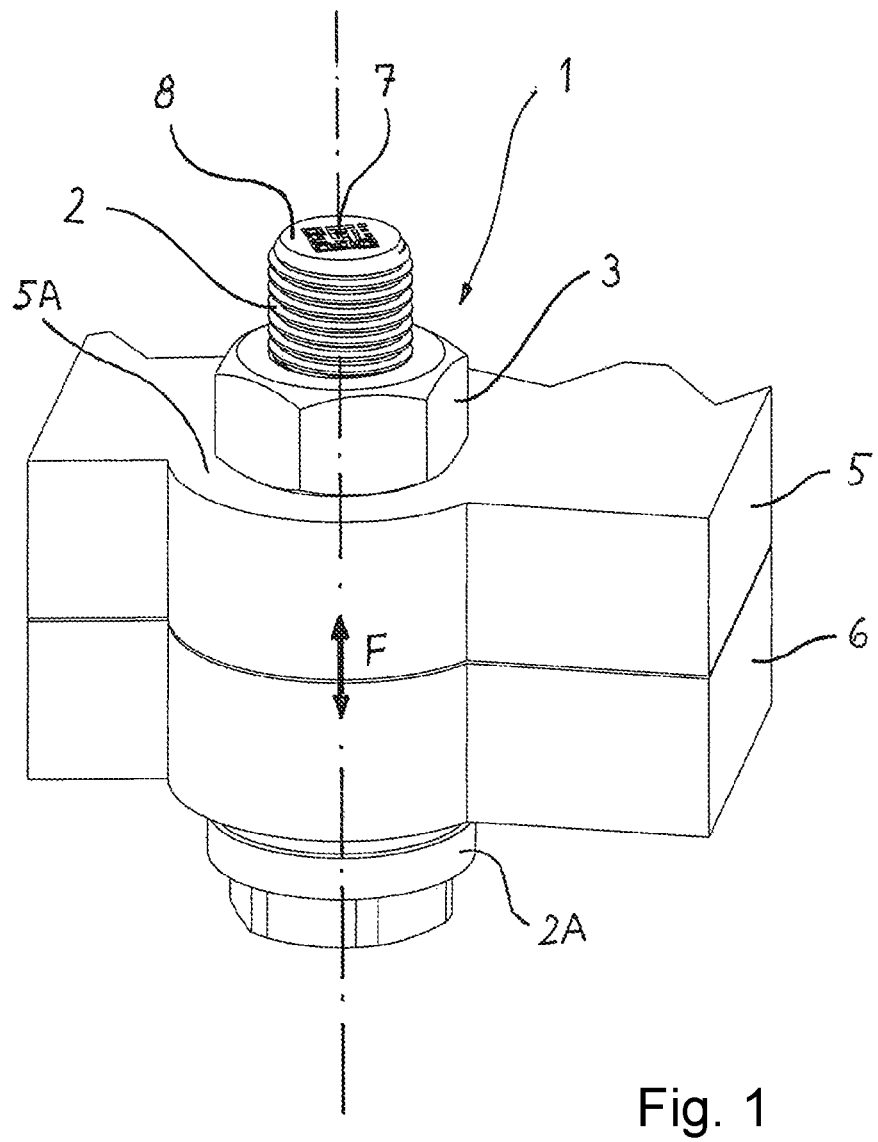
FIG. 1 shows a view of a threaded bolt comprising a nut, tensioning two machine parts.

The screw connection 1 shown in FIG. 1 comprises a threaded bolt 2 which is composed of a widened bolt head 2A and a shank and threaded portion and a nut 3 screwed onto the threaded portion. The screw connection 1 in this case tensions two machine parts 5, 6 relative to one another. In addition to the threaded bolt 2 and the nut 3, further structural elements may also be components of the screw connection 1, for example a further nut on the side of the machine part 6 to be tensioned, remotely from the nut 3. Additional washers may also be components of the screw connection 1.

An identifier 7 is permanently arranged on the threaded bolt 2. In FIG. 1 this is shown by way of example by a barcode 7 arranged on the front face 8 of the threaded bolt 2 and/or the threaded bolt end. The barcode 7 is initially scanned by a sensor. The barcode 7 in this case is detected before the actual tightening or retightening. Thus, the information obtained by the scanning forms the basis of the identification of the exact type of screw connection 1 and thus a prerequisite for determining the important screw connection data for the tensioning process.

The sensor and/or scanner may be arranged, for example, on a handheld tool 10 (FIG. 2) configured as a torque wrench with a torque release value which is able to be set. The handheld tool 10, as described hereinafter, is in any case required within the context of the method. Alternatively, the sensor and/or scanner may be part of a portable computer unit, for example a tablet computer, a smart phone or a related portable computer unit. For example, the sensor may be a camera. A separate scanning module, which is exclusively used for scanning the identifier 7, may also be used. An arrangement of the sensor and/or scanner is also possible directly in or on the tensioning device 11, described in more detail hereinafter. In this case when the tensioning device 11 is placed on the bolt 2 to be tensioned, the barcode 7 is scanned at the same time.

By means of the tensioning device 11 the screw connection 1 is elongated by an exclusively axial tension on the free threaded end 15 of the threaded bolt 2. For the extension process, by means of a process control unit 23 the user may be proposed practical method parameters for the respectively identified type of screw connection 1, for example by recalling data sheets with corresponding values stored in a database. The user may then confirm or decline the parameters thus proposed.

However, an automated method is preferred, with pressure setting on a hydraulic pump 22 of the tensioning device 11 automatically carried out by the process control unit 23 and subsequent automatic activation of the tensioning device.

Figure 2:
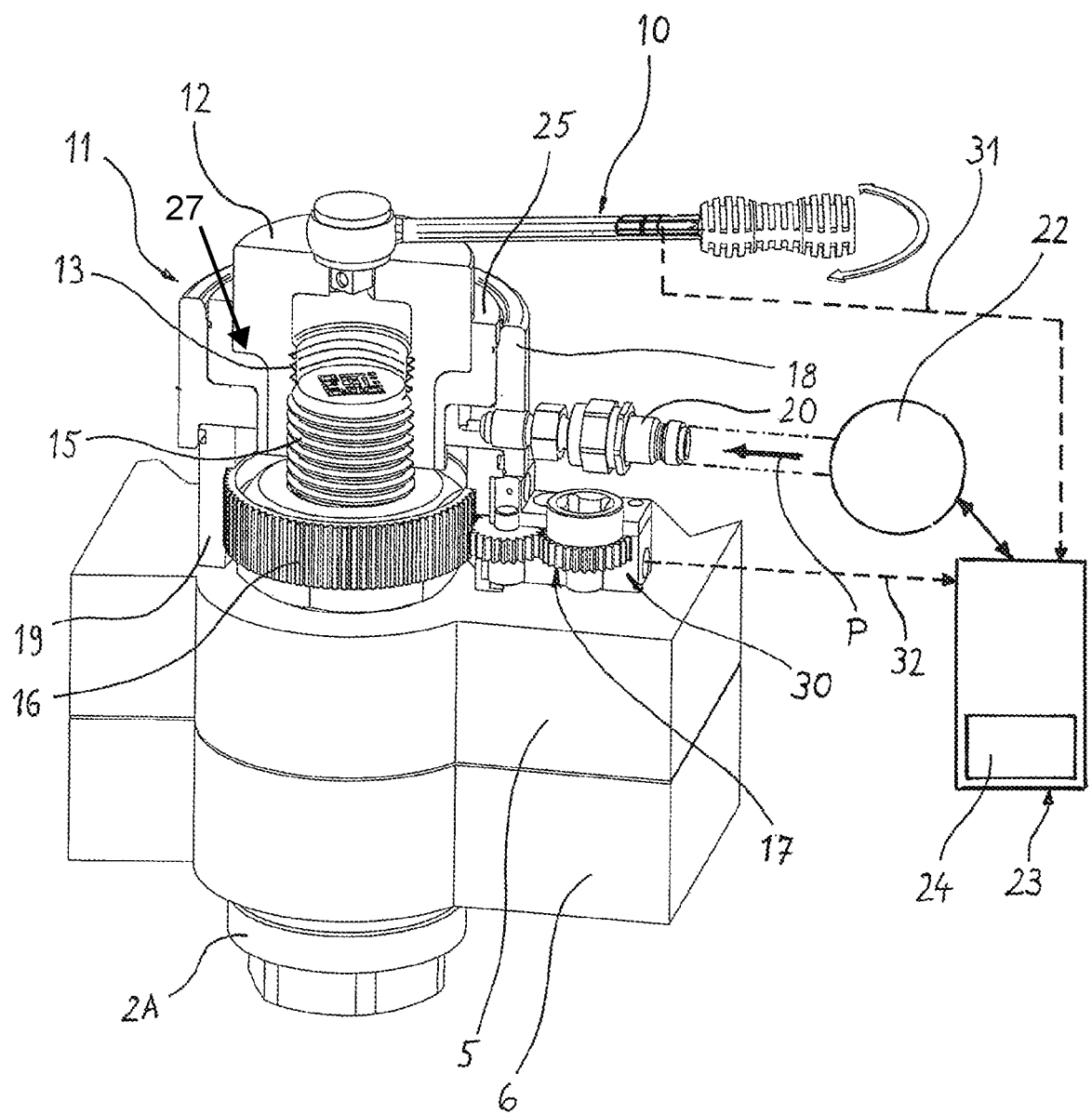
FIG. 2 shows in a perspective view a first embodiment of a hydraulically operating threaded bolt-tensioning device, positioned in alignment with the threaded bolt and supported on the upper machine part. Also shown is a handheld tool when screwing an exchangeable bush onto the free threaded bolt end.
Figure 3:
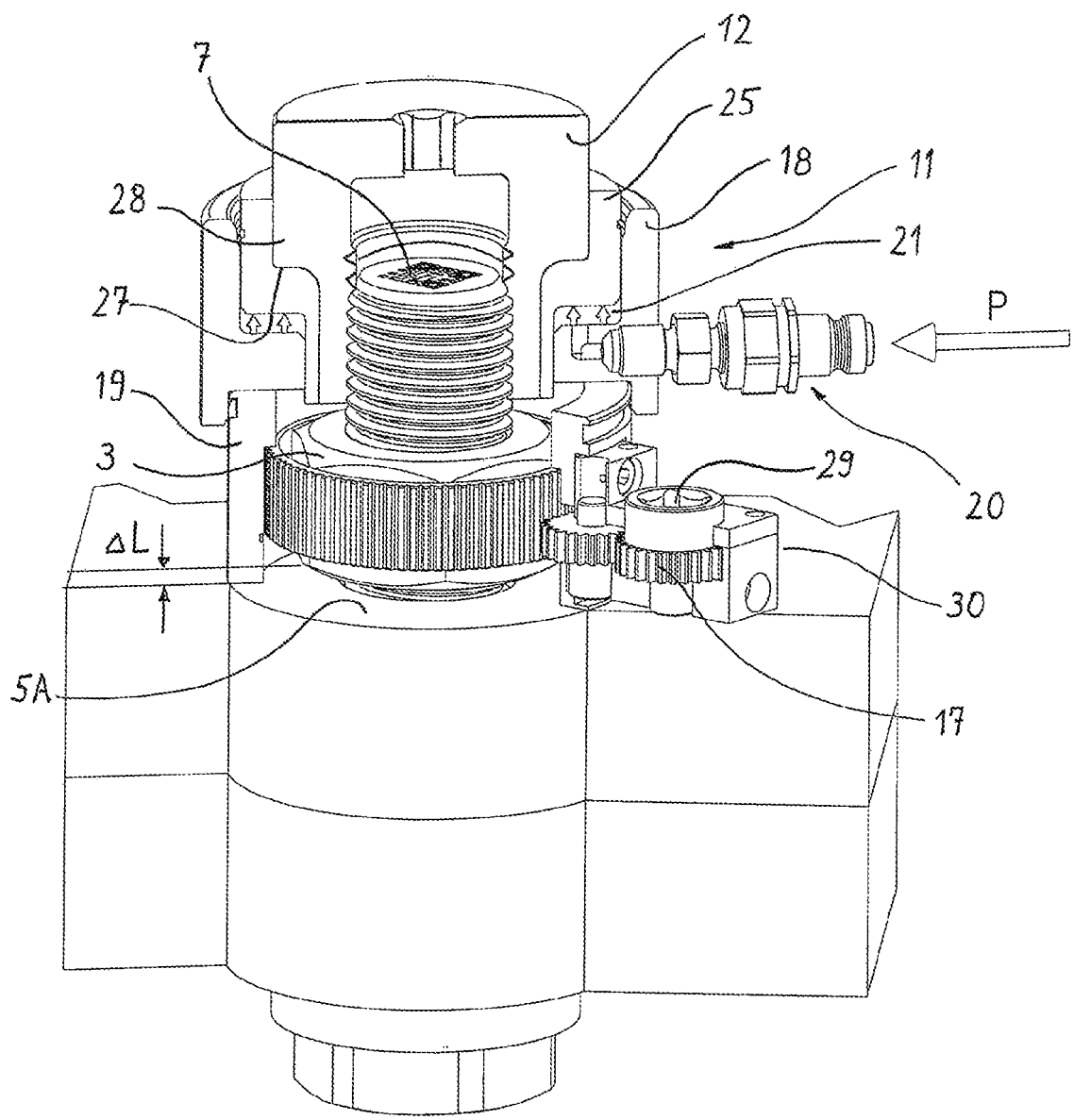
FIG. 3 shows the same tensioning device as in FIG. 2 during the axial tensioning process.
Figure 4:
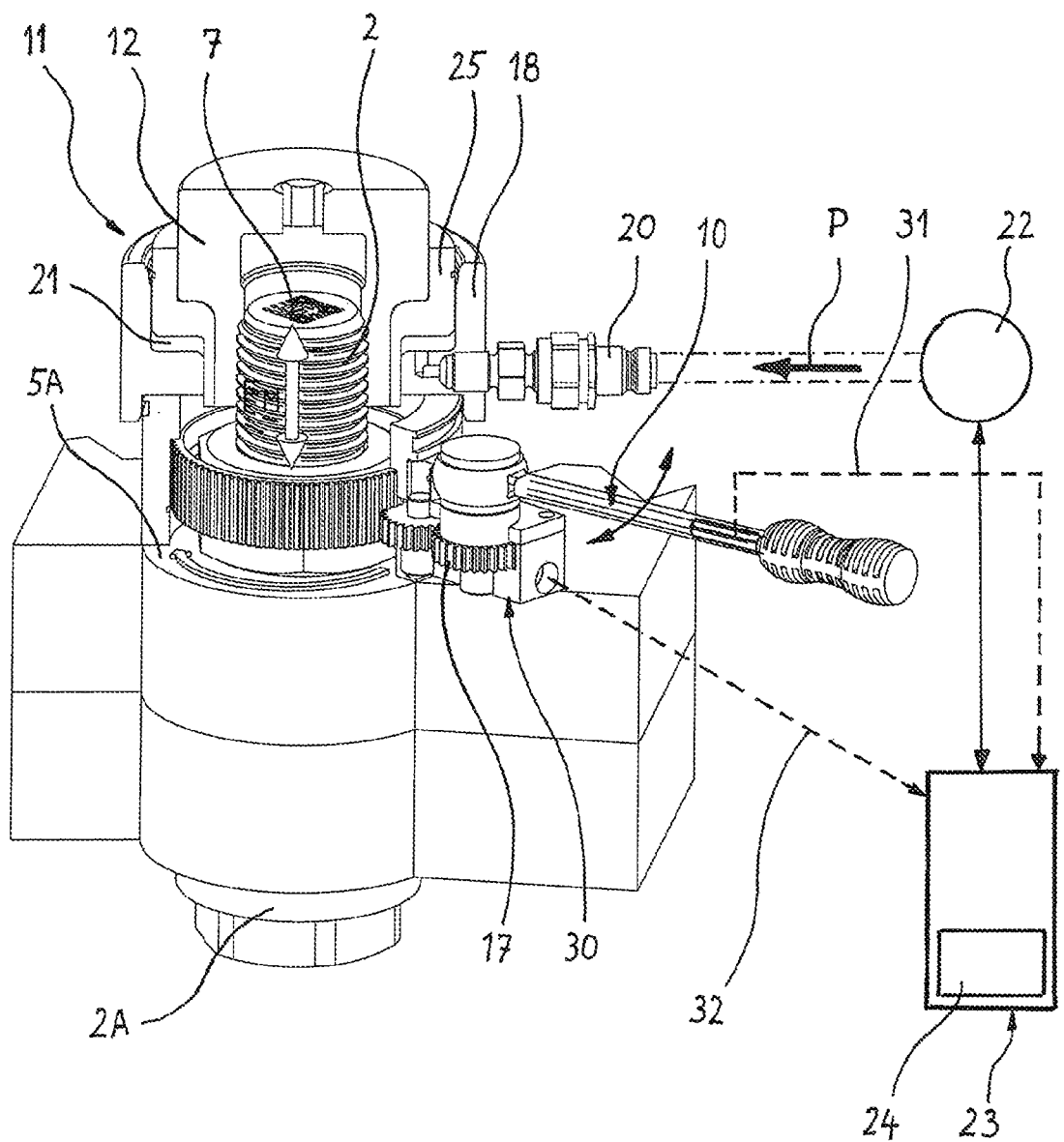
FIG. 4 shows the same tensioning device as in FIG. 2 and FIG. 3 during the retightening of the nut using the handheld tool.

The screw connection is tightened and/or retightened by the purely axially working, hydraulically operated tensioning device. This is shown in FIGS. 2 to 4.

When the tensioning device 11 is activated, the threaded bolt 2 of the screw connection 1 is elongated on its shank and threaded portion by axial tension on the threaded end of the threaded bolt 2 protruding beyond the nut 3. The tightening force applied in this case and/or the tightening pressure applied by means of the hydraulic system is preferably automatically stored in a documentation module 24, irrespective of whether it is a tightening force manually set by the user or a tightening force and/or tightening pressure automatically set by the process control unit 23 and derived from the values in a database.

Whilst the predetermined pretensioning force is exerted on the threaded bolt 2 in the bolt longitudinal direction when the tensioning device 11 is activated for a specific time, the nut 3 of the screw connection 1 may be tightened and/or retightened. This is carried out by means of the handheld tool 10 which is thus configured as a torque wrench with a release function and with a ratchet mechanism. The tightening torque actually applied when turning the nut 3 is stored in the documentation module 24 which is preferably a component of the process control unit 23.

An exchangeable bush 12, which is centrally arranged in the tensioning device 11 in a longitudinally movable manner, is provided at its lower end with an internal thread 13. Before the start of the tensioning process the exchangeable bush 12 is screwed with this internal thread 13 onto the threaded end portion 15 of the threaded bolt 2 protruding beyond the nut 3. This screwing-on process is preferably carried out using the handheld tool 10. During the actual tensioning process, the exchangeable bush 12, which is thus screwed onto the threaded bolt 2, is placed hydraulically under axial tension, whereby the threaded bolt 2 is extended in the longitudinal direction. In this case, a tensile force and/or longitudinal force of the value F is present in the threaded bolt.

Due to the temporary elongation of the bolt 2, the lower face of the nut 3 is released from the support 5A, so that with relatively little rotational resistance the nut 3 may rotate and may be retightened and/or turned until it bears once again without a gap against the support 5A. This is carried out by a torque and/or tightening moment predetermined by a corresponding setting on the torque wrench 10.

A rotary sleeve 16, which is arranged around the nut 3 and positively entrains this nut, is driven by a rotary drive 17. The rotary drive 17 is either a component of the tensioning device 11 itself or is located, as shown, in a module 30 positioned externally on a cylinder housing 18 of the tensioning device 11.

The hydraulic tensioning mechanism is enclosed by the pressure-resistant cylinder housing 18. The rigid projection of the cylinder housing 18 downwardly forms a support tube 19 surrounding the nut 3. The support tube 19 may be integral with the cylinder housing 18 or alternatively a separate component relative to the cylinder housing 18, for example it may be positioned thereon. The support tube 19 is open on its lower face and supported on a solid support 5A, for example the upper face of the machine part 5, which support 5A forms the abutment during the tensioning process. In the method described here the abutment 5A is the machine part 5 against which the nut 3 is supported with its lower face.

A component of the module forming the rotary drive 17 is a gearing which operates through an opening in the support tube 19 onto the rotary sleeve 16. The rotary drive 17 and/or the gearing thereof thus form together with the rotary sleeve 16 the apparatus for turning the nut 3.

The torque required for the turning is applied by moving to and fro the handheld tool 10, which may be positioned on the rotary drive 17 and configured as a ratchet wrench, until a set torque is reached and either a torque limiter is released or a torque signal is emitted. Naturally, the nut 3 may expediently only be rotated when the tensioning device 11 is active.

A hydraulic connection 20 is located at the side of the cylinder housing 18, via which the hydraulic operating chamber 21 of the tensioning device 11 is connected by valve-control to the external hydraulic supply in the form of the hydraulic pump 22. The external hydraulic supply together with the hydraulic pump 22 may be arranged on a trolley.

A piston 25 is movably arranged in the longitudinal direction in the hydraulic cylinder, the piston being sealed toward the internal cylinder wall. By feeding hydraulic pressure into the hydraulic working chamber 21 of the cylinder the piston 25 is raised. This may take place, for example, counter to the force of a strong spring which acts on the piston 25 from above and which serves as a piston restoring spring and acts directly on the piston 25 with a force which aims to keep the piston 25 in its basic position in which the hydraulic working chamber 21 is at its minimum level.

The piston 25 surrounds the exchangeable bush 12 in an annular manner. On its inner edge, the piston 25 is provided with a peripheral shoulder 27 which, remote from the support 5A, forms an entrainment surface against which the exchangeable bush 12 is supported by a radially widened portion 28. In this manner, the exchangeable bush 12 is able to be axially entrained by the piston 25.

The exchangeable bush 12 is provided at its end on the bolt side with the internal thread 13 for screwing onto the threaded bolt 2. At its upper end, the exchangeable bush 12 is provided with a socket 30, a polygonal structure of the handheld tool 10 being able to be positioned against it in order to rotate the exchangeable bush 12 and at the same time to screw the exchangeable bush 12 onto the threaded bolt 2 during the preparation of the tensioning process.

According to FIG. 3, when the hydraulic pump 22 feeds hydraulic fluid at the pressure P into the working chamber 21, the piston 25 is raised and axially entrains the exchangeable bush 12 which is supported on the entrainment surface of the shoulder 27. This results in the elongation of the threaded bolt 2 and the formation of a spacing and/or gap ΔL between the lower face of the nut 3 and the support 5A.

The pressure P provided by the hydraulic pump 22 is automatically set by the process control unit 23 and namely based on the type of screw connection 1 identified by the scanning and based on the pressure or force values predetermined for this model. Alternatively, the values may be manually set by the user.

Retightening, i.e. the turning of the nut 3, is carried out by the rotary drive 17 arranged in the form of the module 30 externally on the tensioning device 11, by using the torque wrench 10 set to a predetermined release value. This torque wrench is positioned on a polygonal drive mechanism 29 on the module 30 and/or on the rotary drive 17.

At least one of the gear elements of the rotary drive 17 or alternatively the torque wrench 10 is provided with a rotation angle sensor. This detects the total rotation angle which is covered during the course of tightening the nut 3 until the release of the torque wrench 10. The detected rotation angle may either be the rotation angle of the nut 3 itself or a further characteristic rotation angle covered by one of the rotating gear elements of the rotary drive or by the torque wrench 10.

The angle value thus detected is initially stored for the purpose of further evaluation, for which the rotation angle sensor is connected to the process control unit 23 by signal technology, so that the detected rotation angle value is available in the process control unit 23 for the purpose of the further processing and evaluation thereof.

During this evaluation, the remaining extension and thus lengthening of the threaded bolt 2 is calculated from the rotation angle value covered during the turning of the nut 3, in conjunction with the known thread pitch of the threaded bolt 2 and the nut 3. This value of the lengthening may be stored in the documentation module 24 and thus permanently documented.

When the predetermined rotation angle, corresponding to the lengthening of the threaded bolt 2, is covered and when the nut 3 is then turned with a predetermined torque until it bears without a gap against the support 5A, it is ensured that the threaded bolt 2 has been tightened with the correct force and that the value F of the longitudinal force present in the threaded bolt 2 has a specific optimal value and/or lies in a corresponding range of values. Thus, the longitudinal force F, which is present after tightening or retightening the screw connection in the longitudinally deformed threaded bolt 2, represents the tensile strain in the bolt 2. It is dependent on the lengthening to which the threaded bolt 2 is subjected during the tensioning process.

In a first calculating step the lengthening of the threaded bolt 2 associated with the elongation is calculated, and namely from the rotation angle covered during the turning of the nut 3, and the thread geometry of the screw connection 1.

In this case the rotation angle covered is not necessarily the rotation angle of the nut 3 itself, but this may also be a different rotation angle coupled to the rotation angle of the nut 3. For example, a gear element of the rotary drive 17 may be detected by means of a rotation angle sensor or the rotation angle sensor is structurally integrated in the cylinder housing of the tensioning device 11 or structurally integrated in the torque wrench 10.

The thread geometry of the screw connection used in the first calculating step as a calculation parameter is the thread pitch of the thread on the threaded bolt 2 and the nut 3. Thus, from the two geometric values of the rotation angle and thread pitch a longitudinal dimension may be directly calculated, in this case therefore the value relative to the elongation of the threaded bolt 2 obtained by the axial tensioning, i.e. the lengthening thereof.

In a second calculating step, the longitudinal force F acting in the tensile direction in the threaded bolt 2 is calculated, and namely from the lengthening of the threaded bolt 2 determined in the first calculating step,
the bolt diameter of the threaded bolt 2
and the bolt length.

The longitudinal force F may be calculated, for example, as follows. E is the modulus of elasticity of the bolt material, A the value of the bolt cross section, L the characteristic bolt length and dL the bolt lengthening.

$$F = \frac{cL}{L} \times (E \times A)$$

The bolt length used for the calculation of the longitudinal force F in the threaded bolt 2 is not the absolute length of the threaded bolt 2 including the radially widened bolt head 2A. Instead it is the length by which the threaded bolt significantly deforms which is relevant. Parts of the threaded portion of the threaded bolt 2 and, if present, a threadless shank portion of the threaded bolt form the characteristic bolt length which is relevant in this regard. The characteristic bolt length used in the second calculating step in this case is the length of the threaded portion and optionally of the shank portion which extends between the bolt head 2A and the nut 3, which is also retained substantially rigidly. A significant lengthening takes place only on this longitudinal portion during the tensioning process.

Being able to calculate an accurate value for the longitudinal force F in the threaded bolt 2 depends on the accuracy when retightening the nut 3. Thus, settling processes may result when retightening the nut, primarily due to unevenness on the contact surfaces. For this reason, a multi-step approach is taken. In a preliminary step, in order to eliminate as far as possible incorrect measurements due to settling processes, the tensioning device 11 is initially only activated at a relatively low hydraulic pressure of, for example, 50 bar. When this preliminary pressure is reached, in the method step a) the nut 3 is tightened by means of the rotary drive 17 with such a predetermined tightening moment that it results in the nut 3 bearing substantially without a gap against the support 5A and settling processes are eliminated.

Only after the substantially gap-free contact of the nut with the support is ensured by means of this preliminary step does the actual tensioning process take place in step b) by activating the tensioning device 11 and thus elongating the screw connection 1. In this case, the significantly higher system pressure of, for example, 1500 bar is set in the tensioning device 11. By maintaining the axial tension exerted, the further retightening and/or turning of the nut 3 is then carried out in step c) together with the detection of a rotation angle covered during this further retightening by means of the rotation angle sensor.

The further retightening of the nut 3 according to step c) is carried out with the same tightening moment as previously in the preliminary step of the original retightening of the nut according to step a).

According to FIG. 4, the torque actually used when retightening the nut 3 is detected by means of the torque sensor by measuring technology. The torque sensor in this case is integrated in the torque wrench 10. The corresponding torque value is transmitted from the torque wrench 10 via the signal path 31 by signal technology to the process control unit 23 and is also stored in the documentation module 24. The rotation angle value is transmitted via the signal path 32.

The transmission of the data and measured values detected when tightening and/or turning the nut 3, to the process control unit 23 is carried out via the signal paths 31, 32 and preferably via wirelessly operating transmitting and receiving units. The rotation angle covered, the torque actually applied and the calculated longitudinal force F in the threaded bolt 2 together with the individual identifier of the screw connection 1 are stored in the documentation module 24 of the process control unit 23. These values may be stored in the documentation module 24, for example in data tables or parameter files. The documented data may be recalled and exported, for example later for purposes of evidence.

A second embodiment is shown in FIGS. 5 to 7. In this case the same reference numerals refer to components which correspond to the components also denoted in the first embodiment.

In contrast to the first embodiment, the module 30 is placed on the tensioning device 11. Integrated therein are not only the rotary drive 17 of the turning device but also the torque sensor which detects the torque used when tightening and when further tightening the nut. The module 30 is provided with a signal connection 33 via which, in addition to the rotation angle value, the torque value is also transmitted to the process control unit 23.

In the second embodiment, therefore, as a whole only one signal path 34 is required, both the rotation angle detected on the rotary drive 17 and the detected torque being transmitted thereby to the process control unit 23. This may be implemented by means of a signal cable or wirelessly by means of corresponding transmitting and receiving units, on the one hand, on the module 30 and, on the other hand, on the part of the process control unit 23.

Also, in the second embodiment, the covered rotation angle, the actually applied torque and the calculated longitudinal force F in the threaded bolt 2 together with the individual identifier of the screw connection 1 are stored in the documentation module 24 of the process control unit 23.

The specification incorporates by reference the entire disclosure of German priority document 10 2019 102 133.2 having a filing date of 29 Jan. 2019 and of German priority document 10 2019 103 850.2 having a filing date of 15 Feb. 2019.

While specific embodiments of the invention have been shown and described in detail to illustrate the inventive principles, it will be understood that the invention may be embodied otherwise without departing from such principles.

LIST OF REFERENCE CHARACTERS

1 Screw connection
2 Threaded bolt
2A Bolt head
3 Nut
5 Machine part
5A Support
6 Machine part
7 Identifier, barcode
8 Front face
10 Handheld tool, torque wrench
11 Tensioning device
12 Exchangeable bush
13 Internal thread
15 Threaded end
16 Rotary sleeve
17 Rotary drive, turning device
18 Cylinder housing
19 Support tube
20 Hydraulic connection
21 Working chamber
22 Hydraulic pump
23 Process control unit
24 Documentation module
25 Piston
27 Shoulder
28 Radially widened portion
29 Polygonal drive mechanism
30 Module
31 Signal path
32 Signal path
33 Signal connection
34 Signal path
F Longitudinal force
ΔL Length, gap
P Pressure

What is claimed is:

1. A method for documented tightening or retightening of a screw connection, comprised of a threaded bolt and of a nut screwed onto the threaded bolt and supported against a support, by using an axially operating tensioning device comprising: a cylinder housing, at least one piston axially movable in the cylinder housing and configured to be subjected to a hydraulic pressure, an exchangeable bush arranged in the cylinder housing and comprising an internal thread at an end facing the threaded bolt and configured to be screwed onto the threaded bolt, wherein the exchangeable bush is configured to be axially entrained by the at least one piston; and further using a rotary drive for the nut, wherein the rotary drive is positioned as a module externally on the cylinder housing, and further using a process control unit comprising a documentation module, the method comprising:

a) tightening the nut with the rotary drive by applying a a first torque which is at least required for the nut to bear without a gap against the support;

b) elongating the screw connection by activating the tensioning device and exerting an axial tension on a threaded end of the threaded bolt protruding beyond the nut to produce an elongation;

c) further tightening the nut with the rotary drive by applying a second torque while maintaining the elongation, and simultaneously detecting a rotation angle covered during further tightening the nut by a rotation angle sensor;

d) calculating a lengthening of the threaded bolt associated with the elongation from
the rotation angle covered during further tightening the nut and
a thread geometry of the screw connection;

e) calculating a longitudinal force in the threaded bolt from
the lengthening of the threaded bolt associated with the elongation,
a bolt diameter of the threaded bolt, and
a bolt length of the threaded bolt;

f) storing the calculated longitudinal force, together with an identifier which identifies the screw connection, in the documentation module;

further comprising detecting the first torque used in step a) for tightening and the second torque used in step c) for further tightening with a torque sensor disposed in the module, and transmitting and storing a first torque value of the first torque detected with the torque sensor and a second torque value of the second torque detected with the torque sensor in the documentation module;

further comprising carrying out tightening in step a) and further tightening in step c) with the first torque and the second torque being identical.

2. The method according to claim 1, further comprising providing the identifier that identifies the screw connection on the screw connection and scanning the identifier that identifies the screw connection for use in step f).

3. The method according to claim 2, wherein the identifier that identifies the screw connection is a barcode identifier.

4. The method according to claim 1, further comprising applying the first torque and the second torque by exerting a force with a handheld tool positioned on the rotary drive.

5. The method according to claim 1, further comprising identifying the identifier that identifies the screw connection prior to step a).

6. The method according to claim 5, further comprising selecting, based on the identifier that identifies the screw connection, a tightening force and/or tightening pressure, stored in a database, and, before activating the tensioning device communicating to a user of the tensioning device by the process control unit the tightening force and/or tightening pressure that has been selected.

7. The method according to claim 5, further comprising automatically selecting, based on the identifier that identifies the screw connection, by the process control unit a tightening force and/or tightening pressure, stored in a database, and automatically pressurizing a hydraulic pump connected to the tensioning device to the tightening force and/or tightening pressure that has been automatically selected by the process control unit.

8. The method according to claim 5, further comprising selecting, based on the identifier that identifies the screw connection, a tightening force and/or tightening pressure, stored in a database, by the process control unit and automatically activating by the process control unit the tensioning device by using the tightening force and/or tightening pressure that has been selected.

9. The method according to claim 1, wherein the step of simultaneously detecting a rotation angle covered during further tightening comprises arranging the rotation angle sensor in the module for detecting the rotation angle covered during further tightening the nut.

10. The method according to claim 9, further comprising transmitting signals between the module and the process control unit by wire or wireless.

11. The method according to claim 1, wherein the step of simultaneously detecting a rotation angle covered during further tightening comprises arranging the rotation angle sensor on a torque wrench, to be positioned on the module, for detecting the rotation angle covered during further tightening the nut.

* * * * *